(12) United States Patent
Oh et al.

(10) Patent No.: US 9,174,547 B2
(45) Date of Patent: Nov. 3, 2015

(54) ELECTRIC VEHICLE AND CHARGING CONTROL METHOD FOR AUXILIARY BATTERY THEREOF

(75) Inventors: Won Jin Oh, Incheon-si (KR); Sun Yong Kim, Goyang-si (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 13/813,390

(22) PCT Filed: Aug. 1, 2011

(86) PCT No.: PCT/KR2011/005644
§ 371 (c)(1),
(2), (4) Date: Jan. 30, 2013

(87) PCT Pub. No.: WO2012/018205
PCT Pub. Date: Feb. 9, 2012

(65) Prior Publication Data
US 2013/0127400 A1 May 23, 2013

(30) Foreign Application Priority Data
Aug. 2, 2010 (KR) .................... 10-2010-0074754

(51) Int. Cl.
*B60L 11/18* (2006.01)
*B60L 11/14* (2006.01)
(Continued)

(52) U.S. Cl.
CPC ............ *B60L 11/1811* (2013.01); *B60L 3/003* (2013.01); *B60L 3/04* (2013.01); *B60L 11/14* (2013.01); *B60L 11/1868* (2013.01); *H02J 7/045* (2013.01); *B60L 2210/10* (2013.01); *B60L 2210/12* (2013.01); *B60L 2240/527* (2013.01); *B60L 2240/529* (2013.01); *B60L 2240/80* (2013.01); *H02J 7/0054* (2013.01); *H02J 7/0068* (2013.01);
(Continued)

(58) Field of Classification Search
CPC . B60L 11/1811; B60L 11/1868; H02J 7/0054
USPC ........................................................ 320/104
See application file for complete search history.

(56) References Cited

U.S. PATENT DOCUMENTS 5,783,872 A * 7/1998 Blair .............................. 307/46
8,447,452 B2 * 5/2013 Katoh et al. .................... 701/22
(Continued)

*Primary Examiner* — Sun Lin
(74) *Attorney, Agent, or Firm* — Dentons US LLP

(57) ABSTRACT

The present invention relates to an electric vehicle and a charging control method for an auxiliary battery of the electric vehicle. According to the present invention, the electric vehicle comprises: a high-voltage battery which drives the electric vehicle; a plurality of electric field loads; the auxiliary battery which supplies driving power to the plurality of electric field loads; a first voltage detection unit which detects an output voltage of an auxiliary battery side; a converter which performs a PWM switching to convert the voltage of the high-voltage battery into a voltage required in the electric field loads; a plurality of relays; a power relay assembly (PRA) which is switched to supply the energy of the high-voltage battery to the converter according to whether or not the plurality of relays are in operation; and a vehicle control module (VCM) which controls the driving of the power relay assembly, wherein the converter includes a converter control unit, which sends a driving instruction signal requesting the vehicle control module to drive the power relay assembly depending on a magnitude change of the output voltage of the auxiliary battery side. Accordingly, discharging of the auxiliary battery in a starting-off state is prevented, which makes it possible to stably operate the electric vehicle system.

11 Claims, 3 Drawing Sheets

(51) Int. Cl.
  *H02J 7/04* (2006.01)
  *B60L 3/00* (2006.01)
  *B60L 3/04* (2006.01)
  *H02J 7/00* (2006.01)

(52) U.S. Cl.
  CPC .............. *Y02T 10/70* (2013.01); *Y02T 10/7005* (2013.01); *Y02T 10/7066* (2013.01); *Y02T 10/7077* (2013.01); *Y02T 10/7216* (2013.01); *Y02T 10/7233* (2013.01)

(56) References Cited

U.S. PATENT DOCUMENTS

| | | | |
|---|---|---|---|
| 8,659,182 B2* | 2/2014 | Ichikawa et al. | 307/9.1 |
| 8,736,101 B2* | 5/2014 | Masuda et al. | 307/10.1 |
| 8,928,272 B2* | 1/2015 | Song | 320/104 |
| 2003/0117113 A1* | 6/2003 | Takemasa et al. | 320/150 |
| 2008/0234897 A1* | 9/2008 | Tsuchida | 701/42 |
| 2010/0181829 A1* | 7/2010 | Ichikawa et al. | 307/9.1 |
| 2013/0127247 A1* | 5/2013 | Oh et al. | 307/10.1 |

* cited by examiner

ELECTRIC VEHICLE AND CHARGING CONTROL METHOD FOR AUXILIARY BATTERY THEREOF

TECHNICAL FIELD

The present invention relates to an electric vehicle and a battery charging control method thereof, and more particularly to an electric vehicle and a method for controlling charging of an auxiliary battery of the electric vehicle, which can check a State of Charge (SOC) state of the auxiliary battery when the electric vehicle is turned off, and provide energy of a high-voltage battery to the auxiliary battery so as to charge the auxiliary battery.

BACKGROUND ART

Electric vehicles (EVs) have been actively studied because they are the most promising solution to pollution and energy problems.

Electric vehicles (EVs) are mainly powered by an AC or DC motor using battery power. Electric vehicles are broadly classified into battery powered electric vehicles and hybrid electric vehicles. In the battery powered electric vehicles, a motor is driven using power of a battery, and the battery is recharged after stored power is consumed. In hybrid electric vehicles, a battery is charged with electricity generated via engine driving, and an electric motor is driven using the electricity to realize vehicle movement.

The hybrid electric vehicles may further be classified into serial and parallel types. In the case of serial hybrid electric vehicles, mechanical energy output from an engine is changed into electric energy via a generator, and the electric energy is fed to a battery or motor. Thus, the serial hybrid electric vehicles are always driven by a motor similar to conventional electric vehicles, but an engine and generator are added for the purpose of increasing range. Parallel hybrid electric vehicles may be driven using two power sources, i.e. a battery and an engine (gasoline or diesel). Also, the parallel hybrid electric vehicles may be driven using both the engine and the motor according to traveling conditions.

With recent gradual development of motor/control technologies, small high-output and high-efficiency systems have been developed. Owing to replacing a DC motor by an AC motor, electric vehicles have accomplished considerably enhanced output and power performance (acceleration performance and maximum speed) comparable to those of gasoline vehicles. As a result of promoting a higher output and higher revolutions per minute, a motor has achieved reduction in weight and size, and consequently reduction in the weight and size of a vehicle provided with the motor.

A typical vehicle is configured to operate internal loads using a small-sized battery, or starts operation using energy of a small-sized battery. Although the electric vehicle includes a high-voltage battery for operating the vehicle, a small-sized auxiliary battery is discharged upon completion of starting of the electric vehicle. If a battery voltage reaches a discharge stop voltage, the battery is no longer used and it is impossible to resume the electric vehicle system.

DISCLOSURE

Technical Problem

Therefore, the present invention has been made in view of the above problems, and an object of the present invention is to provide an electric vehicle and a method for controlling charging of an auxiliary battery of the electric vehicle, which can automatically charge an auxiliary battery on the condition that the electric vehicle is turned off.

Technical Solution

In accordance with one aspect of the present invention, the above and other objects can be accomplished by an electric vehicle which includes a high-voltage battery for driving the electric vehicle, a plurality of loads, and an auxiliary battery for supplying drive power to the plurality of loads, the electric vehicle including: a first voltage detection unit for detecting an output voltage of the auxiliary battery; a converter for converting a voltage of the high-voltage battery into a voltage needed for the loads through PWM switching; a power relay assembly (PRA) including a plurality of relays, configured to be switched in a manner that energy of the high-voltage battery is supplied to the converter according to whether the relays are operated; and a vehicle control module (VCM) for controlling driving of the power relay assembly (PRA), wherein the converter includes a charger controller for transmitting, according to a variation of the output voltage of the auxiliary battery, a drive command signal requesting driving of the power relay assembly (PRA) to the vehicle control module (VCM) to charge the auxiliary battery.

In accordance with another aspect of the present invention, a method for controlling charging of an auxiliary battery of an electric vehicle which includes a plurality of loads and an auxiliary battery includes: detecting an output voltage of the auxiliary battery for supplying drive power to the plurality of loads; comparing the detected output voltage of the auxiliary battery with a predetermined voltage; and if the output voltage of the auxiliary battery is equal to or less than the predetermined voltage, entering a charging mode of the auxiliary battery by driving a converter.

Advantageous Effects

In accordance with the embodiments of the present invention, a method for controlling charging of an auxiliary battery of an electric vehicle has the following advantages. If the electric vehicle stops driving, it is charged with energy of the high-voltage battery on the basis of the remaining amount (lifespan) of the auxiliary battery, such that the electric vehicle according to the embodiments can solve the related art problem in which the auxiliary battery is no longer used because it reaches a discharge stop voltage in response to persistent discharging of the auxiliary battery.

Since the auxiliary battery is prevented from being discharged, the electric vehicle system can be stably operated.

When checking the remaining charge of the auxiliary battery, the converting operation of the converter is turned off such that consumption of standby power can be minimized.

DESCRIPTION OF DRAWINGS

The above and other objects, features and other advantages of the present invention will be more clearly understood from the following detailed description taken in conjunction with the accompanying drawings.

BEST MODE

Embodiments of the present invention will be described below with reference to the attached drawings. The electric vehicle and a method for controlling charging of an auxiliary battery of the electric vehicle according to embodiments of the present invention will hereinafter be described with reference to FIGS. 1 to 4.

The terms "module" and "unit" used to signify components are used herein to aid in the understanding of the components and thus they should not be considered as having specific meanings or roles. Accordingly, the terms "module" and "unit" may be used interchangeably.

Figure 1:
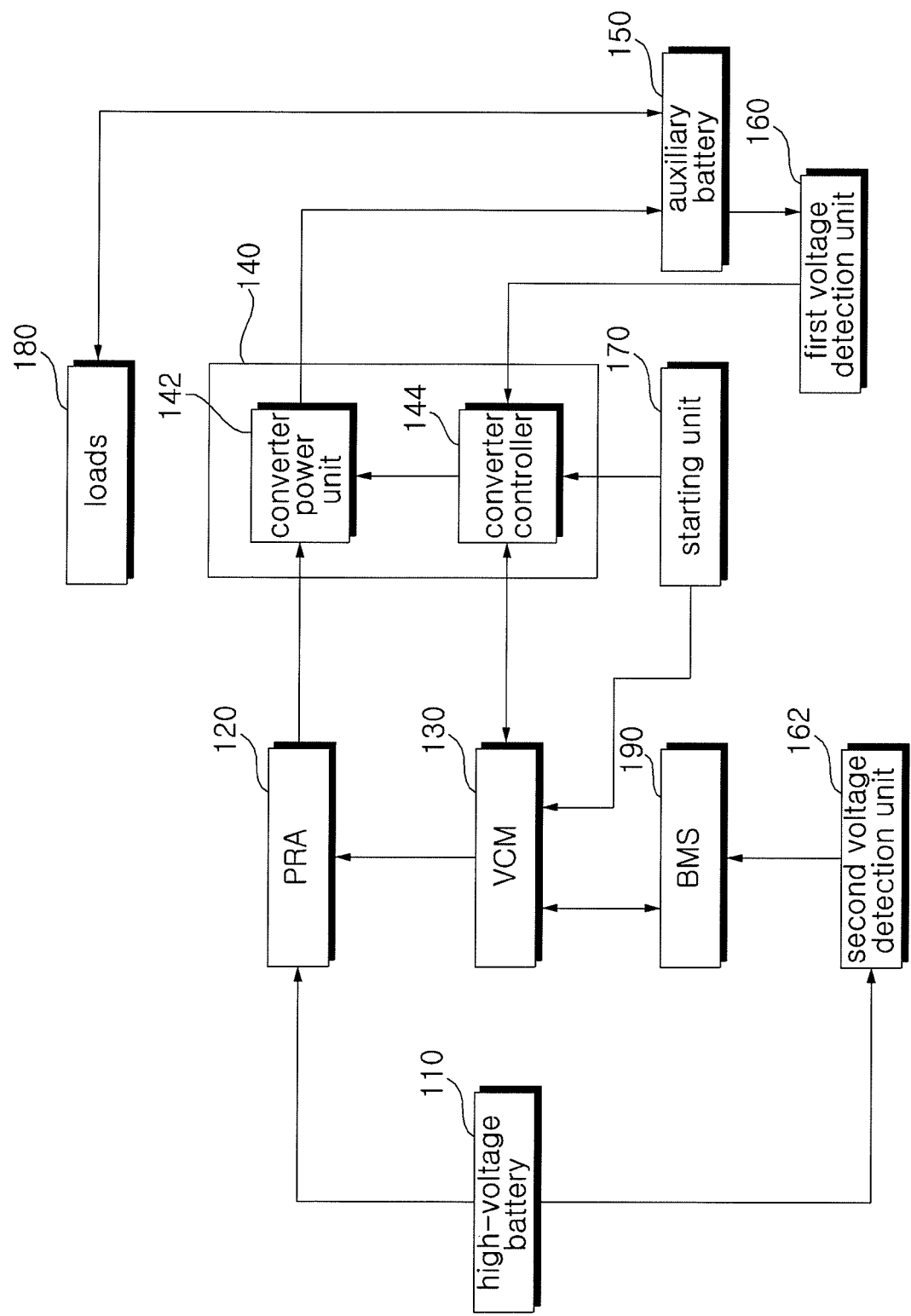
FIG. 1 is a block diagram illustrating constituent components of an electric vehicle according to an embodiment of the present invention.

FIG. 1 is a block diagram illustrating constituent components of an electric vehicle according to an embodiment of the present invention.

The electric vehicle according to an embodiment of the present invention will be described below with reference to FIG. 1 in terms of functional components thereof.

Referring to FIG. 1, the electric vehicle includes a high-voltage battery 110, a power relay assembly (PRA) 120, a vehicle control module (VCM) 130, a converter 140, an auxiliary battery 150, a first voltage detection unit 160, a second voltage detection unit 162, a starting unit 170, a load 180, and a battery management system (BMS) 190. As can be seen from FIG. 1, a voltage detection unit is classified into the first voltage detection unit 160 and the second voltage detection unit 162

In actual implementation, two or more of these components may be incorporated into a single component, or one component may be configured separately as two or more components, as needed.

The high-voltage battery 110 includes a plurality of batteries to store high-voltage electric energy. The high-voltage battery 110 is charged with electricity upon receiving power from a charging station, a vehicle charging installation, a home or an external part.

The high-voltage battery 110 is coupled to a converter power unit 142 of the converter 140 while interposing the PRA 120 therebetween, so that it can provide energy to the converter.

The high-voltage battery 110 is used as a main power-supply source for providing energy needed to drive the electric vehicle or energy needed for driving loads.

The PRA 120 is comprised of a switching element. Although the PRA 120 is implemented as a relay for connecting the high-voltage battery 110 to a converter power unit 142 of the converter 140, the scope or spirit of the present invention is not limited thereto, and the relay may also be comprised of a semiconductor circuit or a bimetal switch as necessary.

The PRA 120 is operated under the control of the VCM 130. The PRA 120 may switch a plurality of relays upon receiving an output signal from the VCM 130.

Specifically, when the vehicle starts or stops driving, the PRA 120 switches a plurality of relays according to a predetermined order, such that the operating power of high voltage stored in the battery 110 can be applied to individual parts of the vehicle. If the VCM 130 is switched on, energy of the battery 110 can be applied to the converter power unit 142 of the converter 140.

Particularly, when the vehicle starts driving, the PRA 120 sequentially controls relays to prevent the operating power of a high voltage from being suddenly applied to the vehicle, so that power can be stably supplied to the vehicle.

The VCM 130 switches the PRA 120 on or off, and can control the converter power unit 142 by communicating with the converter controller 144 of the converter 140.

The VCM 130 can receive an ignition-ON (IGN ON) signal from the starting unit 170. Upon receiving the IGN-ON signal from the starting unit 170, the VCM 130 can control overall vehicle driving.

The VCM 130 can control the high-voltage battery 110 through the BMS 190.

In accordance with one embodiment of the present invention, the remaining lifespan of the auxiliary battery 150 is detected by the first voltage detection unit 160. If the remaining amount (lifespan) of the auxiliary battery 150 is less than a predetermined voltage, there is a high risk of the auxiliary battery 150 being completely discharged.

The first voltage detection unit 160 receives the remaining lifetime of the auxiliary battery, and transmits a signal indicating that the remaining charge of the auxiliary battery is less than a predetermined voltage under the condition that the electric vehicle does not start ignition, such that the converter controller 144 is driven.

The converter controller 144 transmits a PRA (Power Relay Assembly) control command signal requesting control of the PRA 120 to the VCM 130. The VCM 130 receives the PRA control command signal, such that it switches on the PRA 120. If the PRA 120 is switched on, the high-voltage battery 110 is connected to the converter power unit 142, and energy of the high-voltage battery 110 is transferred to the converter power unit 142.

The converter 140 performs PWM switching upon receiving a control signal from the VCM 130, such that a battery voltage of several hundreds of V is converted into a voltage (e.g., about 12V) needed for load.

The converter 140 may include the converter power unit 142 and the converter controller 144.

The converter power unit 142 is connected to the battery 110 while the PRA 120 is interposed therebetween. If the relay of the PRA 120 is switched on, the relay receives energy from the battery 110 such that the energy can be supplied to the auxiliary battery 150.

The converter power unit 142 is under the control of the converter controller 144. The converter controller 144 receives an ignition-OFF (IGN-OFF) signal from the starting unit 170. If the converter controller 144 receives a signal indicating that the remaining charge of the auxiliary battery is less than a predetermined voltage from the first voltage detection unit 160, it controls the converter power unit 142 so that the electric vehicle enters an auxiliary battery charging mode.

In the auxiliary battery charging mode, energy of the high-voltage battery 110 can be supplied to the auxiliary battery 150.

The converter controller 144 can receive specific information indicating that a voltage detected by the auxiliary battery 150 is lower than a predetermined voltage from the first detection unit 160.

If the voltage of the auxiliary battery 150 is lower than the predetermined voltage, the converter controller 144 is driven, and the electric vehicle enters the auxiliary battery charging mode for charging the auxiliary battery 150. In the auxiliary battery charging mode, the converter controller 144 transmits a PRA drive command signal to the VCM 130.

In accordance with one embodiment of the present invention, in the auxiliary battery charging mode, if the remaining voltage of the auxiliary battery 150 is less than a predetermined voltage corresponding to 20% of a maximum capacity of the auxiliary battery, the electric vehicle enters the charging mode.

Experimentally, since charging of the auxiliary battery 150 is completed after lapse of a predetermined time, the auxiliary battery 150 needs to be charged for a predetermined time, and stops charging after lapse of the predetermined time.

The VCM 130 receives a PRA drive command signal requesting driving of the PRA 120, such that it controls the PRA 120 to be switched on.

The auxiliary battery 150 receives a voltage for loads from the converter 140 so that it is charged with the received voltage and energy based on the charged voltage can be supplied to each load.

The output voltage of the auxiliary battery 150 can be detected by the first voltage detection unit 160. Although the starting unit 170 is powered off, the first voltage detection unit 160 can detect the output voltage of the auxiliary battery 150.

The first voltage detection unit 160 detects the output voltage of the auxiliary battery 150 so that it outputs the detected voltage.

The first voltage detection unit 160 measures a voltage of the auxiliary battery, and compares the measured voltage with a predetermined voltage. If the measured voltage is less than the predetermined voltage, the first voltage detection unit 160 outputs a signal indicating this situation to the converter controller 144.

The starting unit 170 may include a starting switching unit (not shown) and a starting switch driver (not shown). The starting switching unit may switch on or off connection between a key box and a vehicle accessory or connection between the battery and a wire of the vehicle. The starting switch driver (not shown) is configured to drive the starting switching unit.

The starting unit 170 may generally include not only the starting unit activated by a vehicle key, but also the starting unit of a start button.

Although the load 180 refers to electronic power steering, a water pump, an air-conditioner, a turn signal, a tail lamp, a head lamp, brushes, etc. for convenience of a driver who drives the electric vehicle or a hybrid electric vehicle, the scope or spirit of the present invention is not limited thereto, and can also be applied to other examples as necessary.

The battery management system (BMS) 190 determines the remaining battery capacity and the presence or absence of charging necessity, and performs a management operation for providing the charging current stored in the battery 110 to each part of the electric vehicle.

When charging and using the battery, the BMS 190 maintains a regular voltage difference between cells of the battery, and controls the battery not to be overcharged or overdischarged, resulting in increased battery lifespan.

The BMS 190 performs management of the use of the current so as to perform long duration traveling of the vehicle, and includes a protection circuit for supplied current.

The first voltage detection unit 160 detects the output voltage of the auxiliary battery 150, and compares the detected voltage with a predetermined voltage. If the detected voltage is less than the predetermined voltage, the first voltage detection unit 160 transmits a signal indicating this situation to the converter controller 144 of the converter 140. The predetermined voltage stored in the first voltage detection unit 160 may be about 20% of the maximum capacity of the auxiliary battery.

Detailed operations of the converter controller 144 are as follows.

Figure 2:
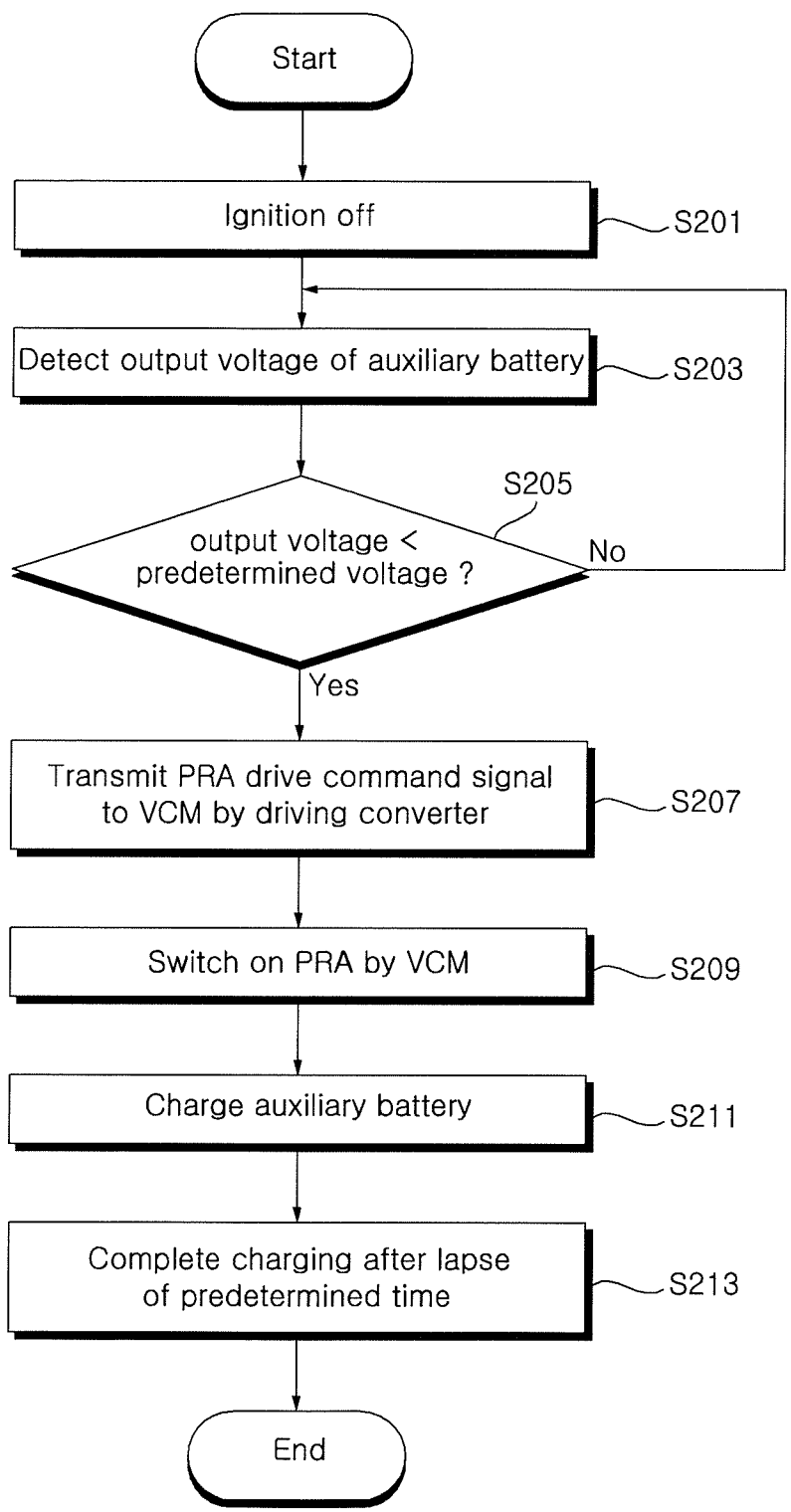
FIG. 2 is a flowchart illustrating a method for controlling charging of an auxiliary battery according to an embodiment of the present invention.

FIG. 2 is a flowchart illustrating a method for controlling charging of an auxiliary battery according to an embodiment of the present invention.

Referring to FIG. 2, the starting unit 170 is powered off, such that the converter 140 is also powered off and the electric vehicle stops driving in step S201.

Under the condition that the electric vehicle stops driving, the first voltage detection unit 160 detects the amplitude of the output voltage of the auxiliary battery 150 in step S203.

Although the starting unit 170 is powered off, the first voltage detection unit 160 is operated. Under the condition that standby power of the converter controller 144 is minimized to start operation of the converter controller 144, the electric vehicle is scheduled to receive the signal, indicating that the voltage detected by the first voltage detection unit 160 is less than the predetermined voltage, from the first voltage detection unit 160. The first voltage detection unit 160 may determine about 20% of a maximum voltage of, the auxiliary battery 150 to be a predetermined voltage, so that the predetermined voltage can be compared with the output voltage of the first voltage detection unit 160. The above-mentioned numerical values are only exemplary, and the scope or spirit of the present invention is not limited thereto, and can also be applied to other examples.

If the output voltage of the auxiliary battery 150 is less than the predetermined voltage, a signal indicating this situation is transferred to the converter controller 144, such that the converter controller 144 is driven. The converter controller 144 transmits a request signal for requesting the VCM 130 to switch on the PRA 120 to the VCM 130. That is, the converter controller 144 transmits a drive command signal of the PRA 120 to the VCM 130 in step S207.

The VCM 130 receives the PRA drive command signal from the converter controller 144, and switches on the PRA 120, such that the high-voltage battery 110 is connected to the converter power unit 142 in step S209.

If the converter power unit 142 receives an IGN-OFF signal from the starting unit 170 through the converter controller 144, and also receives the signal indicating that the remaining charge of the auxiliary battery is less than the predetermined voltage from the first voltage detection unit 160 through the converter controller 144, the converter power unit 142 enters the auxiliary battery charging mode so that energy of the high-voltage battery 110 is supplied to the auxiliary battery 150. In other words, the auxiliary battery 150 starts charging in step S211.

Information as to whether charging of the auxiliary battery 150 is completed may be determined by an experimentally measured time. Accordingly, after lapse of the experimentally determined time, the PRA 120 is switched off so that battery charging is completed in step S213.

For example, battery charging is completed at a predetermined time corresponding to about 50%-60% of a maximum voltage of the auxiliary battery 150. However, the scope or spirit of the present invention is not limited thereto, and can also be applied to other examples as necessary.

As a result, the electric vehicle according to the embodiment can solve the related art problem in which the auxiliary battery is no longer used because it reaches a discharge stop voltage in response to persistent discharging of the auxiliary battery.

Figure 3:
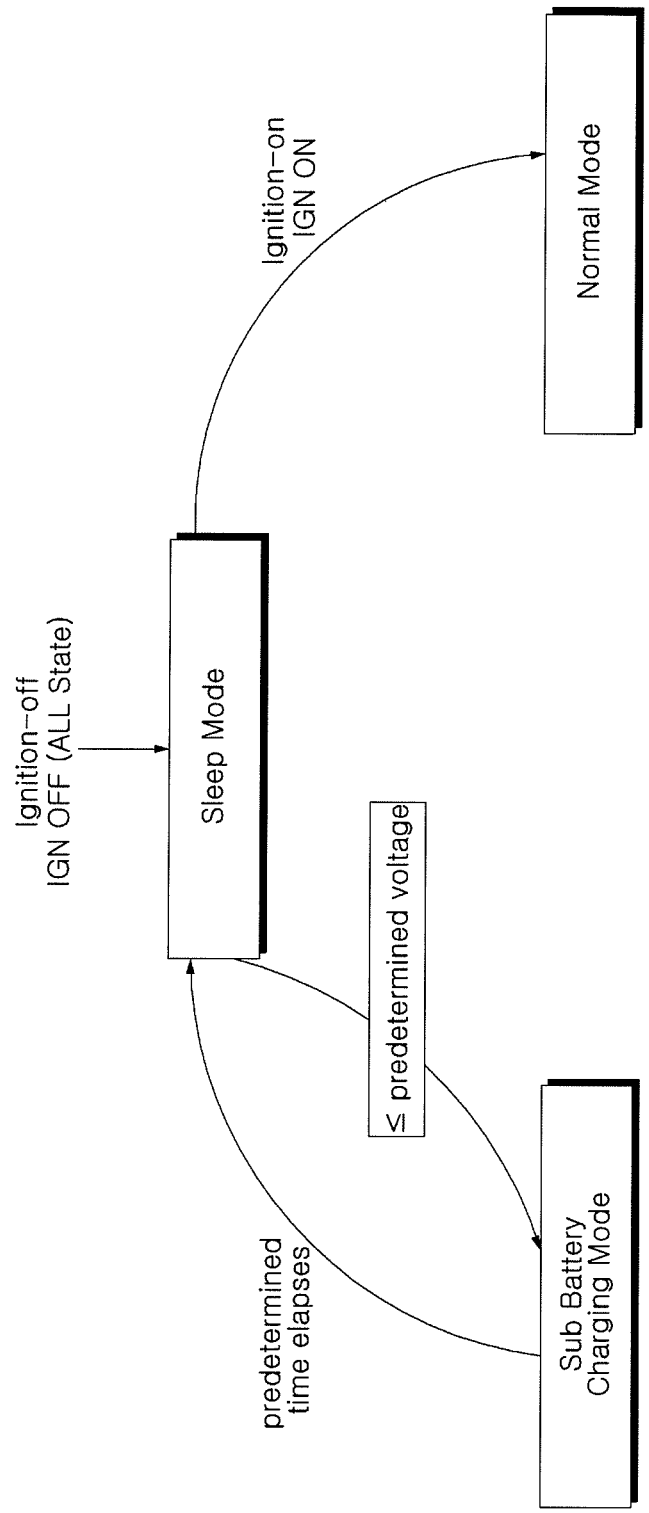
FIG. 3 is a flowchart illustrating a method for controlling charging of an auxiliary battery according to another embodiment of the present invention.

FIG. 3 is a flowchart illustrating a method for controlling charging of an auxiliary battery according to another embodiment of the present invention.

Referring to FIG. 3, if the electric vehicle first receives the IGN-OFF signal (indicating an ignition-off state), the electric vehicle enters a sleep mode.

In the sleep mode, if the electric vehicle stops driving, the IGN-OFF signal is input to the VCM 130, and the VCM 130 controls the PRA 120 in a manner that the PRA 120 is switched off.

Since the PRA 120 is switched off, the high-voltage battery 110 is disconnected from the converter 140. That is, the converter 140 is powered off so that it enters the sleep mode.

In the sleep mode state, the first voltage detection unit 160 measures the output voltage of the auxiliary battery 150. If the output voltage of the auxiliary battery 150 is equal to or less than a predetermined voltage, the electric vehicle enters the auxiliary battery charging mode.

In the auxiliary battery charging mode, the converter controller 144 receives the IGN-OFF signal and the signal indicating that the remaining charge of the auxiliary battery is less than the predetermined voltage, and transmits the PRA drive command signal to the VCM 130 so that the PRA is switched on, such that energy of the high-voltage battery 110 is supplied to the auxiliary battery 150.

After lapse of a predetermined time elapses while the auxiliary battery is charged in the auxiliary battery charging mode, the electric vehicle returns to the sleep mode.

For returning to the sleep mode, the PRA 120 for interconnecting the high-voltage battery 110 and the auxiliary battery 150 is switched off, such that the auxiliary battery 150 stops charging. The VCM 130 measures the switching-ON time of the PRA 120, such that it switches off the PRA 120 after lapse of a predetermined time.

If the PRA 120 is switched off, the high-voltage battery 110 is disconnected from the converter 140 so that no power is supplied to the converter 140 and the converter 140 returns to the sleep mode.

In contrast, if the IGN-ON signal is input to the electric vehicle under the condition that the starting unit is switched on, the electric vehicle enters a normal mode. In the normal mode, the starting unit 170 is switched on such that the electric vehicle can be normally driven.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An electric vehicle which includes a high-voltage battery for driving the electric vehicle, a plurality of loads, and an auxiliary battery for supplying drive power to the plurality of loads, comprising:
   a first voltage detection unit for detecting an output voltage of the auxiliary battery;
   a converter for converting a voltage of the high-voltage battery into a voltage needed for the loads through pulse-width modulation (PWM) switching;
   a power relay assembly (PRA) including a plurality of relays, configured to be switched in a manner that energy of the high-voltage battery is supplied to the converter according to whether the relays are operated; and
   a vehicle control module (VCM) for controlling driving of the PRA, wherein the converter includes a converter controller for transmitting, according to a variation of the output voltage of the auxiliary battery, a PRA drive command signal requesting driving of the PRA to the VCM to charge the auxiliary battery.

2. The electric vehicle according to claim 1, wherein the converter controller, if the output voltage of the auxiliary battery is equal to or less than a predetermined voltage, transmits the PRA drive command signal of the PRA to the VCM.

3. The electric vehicle according to claim 1, wherein the VCM drives the PRA upon receiving the PRA drive command signal from the converter controller.

4. The electric vehicle according to claim 1, wherein the converter controller, if a charging time of the auxiliary battery is a predetermined time or longer, stops transmission of the PRA drive command signal thereby resulting in completion of battery charging.

5. The electric vehicle according to claim 1, further comprising:
   a starting unit for starting or stopping the electric vehicle,
   wherein the converter controller, upon receiving an ignition OFF (IGN OFF) signal from the starting unit, transmits the PRA drive command signal requesting driving of the PRA so as to charge the auxiliary battery.

6. The electric vehicle according to claim 1, wherein the converter further includes a converter power unit, which is connected to the high-voltage battery through the PRA, receives energy from the high-voltage battery when the PRA is driven, and transmits the received energy to the auxiliary battery.

7. A method for controlling charging of an auxiliary battery of an electric vehicle which includes a high-voltage battery for driving the electric vehicle, a plurality of loads to which the auxiliary battery can supply drive power, a first voltage detection unit, a converter for converting a voltage of the high-voltage battery into a voltage needed for the plurality of loads through pulse-width modulation (PWM) switching, a power relay assembly (PRA) including a plurality of relays and configured to be switched in a manner that energy of the high-voltage battery is supplied to the converter according to whether the relays are operated, and a vehicle control module (VCM) for controlling driving of the PRA, wherein the converter includes a converter controller,
   the method comprising:
   detecting, by the first voltage detection unit, an output voltage of the auxiliary battery;
   comparing, by the converter controller, the detected output voltage of the auxiliary battery with a predetermined voltage; and
   if the detected output voltage of the auxiliary battery is equal to or less than the predetermined voltage, transmitting, by the converter controller, a PRA drive command signal requesting driving of the PRA to the VCM to charge the auxiliary battery.

8. The method according to claim 7, further comprising, driving, by the VCM, the PRA upon receiving the PRA drive command signal from the converter controller to supply energy of the high voltage battery to the auxiliary battery.

9. The method according to claim 8, wherein the supplying of the high-voltage battery energy to the auxiliary battery is maintained for a predetermined time and then ended.

10. The method according to claim 7, wherein the predetermined voltage means that a charging state of the auxiliary battery corresponds to 20% of a fully-charged state thereof.

11. The method according to claim 7, further comprising, stopping, by a starting unit, the electric vehicle; and
   transmitting, by the converter controller, the PRA drive command signal when the converter controller receives an ignition OFF (IGN OFF) signal from the starting unit.

* * * * *